(12) United States Patent
Unno et al.

(10) Patent No.: US 10,844,457 B2
(45) Date of Patent: Nov. 24, 2020

(54) FERRITIC STAINLESS STEEL FOIL

(71) Applicant: NIPPON STEEL CHEMICAL & MATERIAL CO., LTD., Tokyo (JP)

(72) Inventors: Hiroto Unno, Tokyo (JP); Naoya Sawaki, Tokyo (JP); Naoki Fujimoto, Tokyo (JP); Masahiro Fukuda, Tokyo (JP); Tomohiro Uno, Tokyo (JP); Toru Inaguma, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 0 days.

(21) Appl. No.: 15/570,614

(22) PCT Filed: Aug. 16, 2016

(86) PCT No.: PCT/JP2016/073931
§ 371 (c)(1),
(2) Date: Oct. 30, 2017

(87) PCT Pub. No.: WO2017/030125
PCT Pub. Date: Feb. 23, 2017

(65) Prior Publication Data
US 2018/0282834 A1    Oct. 4, 2018

(30) Foreign Application Priority Data
Aug. 17, 2015    (JP) .................................. 2015-160693

(51) Int. Cl.
| C21D 9/46 | (2006.01) |
| B32B 15/08 | (2006.01) |
| B32B 15/18 | (2006.01) |
| C21D 6/00 | (2006.01) |
| C22C 38/18 | (2006.01) |
| C21D 8/02 | (2006.01) |
| H01M 2/02 | (2006.01) |

(52) U.S. Cl.
CPC ............... *C21D 9/46* (2013.01); *B32B 15/08* (2013.01); *B32B 15/18* (2013.01); *C21D 6/002* (2013.01); *C21D 8/0205* (2013.01); *C21D 8/0226* (2013.01); *C21D 8/0263* (2013.01); *C21D 8/0273* (2013.01); *C22C 38/18* (2013.01); *H01M 2/0287* (2013.01); *B32B 2457/10* (2013.01); *C21D 8/02* (2013.01); *C21D 2211/005* (2013.01); *H01M 2/02* (2013.01)

(58) Field of Classification Search
CPC .... C21D 2211/005; C21D 9/46; C21D 6/002; C21D 6/004; C21D 8/0205; C21D 8/0226; C21D 8/0263; C21D 8/0273; B32B 15/18; C22C 38/18
See application file for complete search history.

(56) References Cited

U.S. PATENT DOCUMENTS

| 6,187,452 | B1 | 2/2001 | Muto et al. | |
| 2006/0263682 | A1* | 11/2006 | Kim ......................... | B32B 3/04 429/176 |
| 2009/0029245 | A1 | 1/2009 | Ibaragi et al. | |
| 2014/0011044 | A1* | 1/2014 | Yamaguchi ............ | C21D 6/002 428/606 |
| 2017/0009312 | A1 | 1/2017 | Unno et al. | |

FOREIGN PATENT DOCUMENTS

| EP | 3109334 A1 | 12/2016 |
| JP | 2000-273586 A | 10/2000 |
| JP | 2004-052100 A | 2/2004 |
| JP | 2007-168184 A | 2/2007 |
| JP | 2011-102423 A | 5/2011 |
| JP | 2012-092360 A | 5/2012 |
| JP | 2012-92361 A | 5/2012 |
| JP | 2013-041788 A | 2/2013 |
| WO | WO 2015/015728 A1 | 2/2015 |
| WO | WO 2015/122523 A1 | 8/2015 |
| WO | WO 2015/155920 A1 | 10/2015 |

OTHER PUBLICATIONS

Zhang, Evolution of microstructure and mechanical properties of cold-rolled SUS430 stainless steel during a continuous annealing process, 2014, Materials Science & Engineering a 598, pp. 22-27. (Year: 2014).*

Hamada, Effect of Texture on r-value of Ferritic Stainless Steel Sheets, 2011, ISIJ International, vol. 51, No. 10, pp. 1740-1748. (Year: 2011).*

Yazawa, Effect of Chromium Content on Relationship Between r-value and {111} Recrystallization Texture in Ferritic Steel, 2003, ISIJ International, vol. 43, No. 10, pp. 1647-1651. (Year: 2003).*

(Continued)

*Primary Examiner* — Monique R Jackson
(74) *Attorney, Agent, or Firm* — Birch, Stewart, Kolasch & Birch, LLP

(57) ABSTRACT

The present invention provides a ferritic stainless steel foil high in stretch-expand formability and further small in anisotropy of deformation with respect to stretch-expand forming even with ultrathin steel foil with a thickness of 60 μm or less. The ferritic stainless steel foil has a thickness of 5 μm to 60 μm, wherein a recrystallization rate of the stainless steel foil is 90% to 100%, and in an orientation distribution function obtained by analysis of a crystalline texture of the stainless steel foil, when a Euler angle $\varphi 2$ is 45°±10°, at a plane expressed by a Euler angle $\Phi$ of 53.4°±10°, a maximum peak strength ratio in peak strength ratios shown by orientations corresponding to a Euler angle $\varphi 1$ is 25 or less, where the Euler angle $\varphi 1$ is 0 to 90°. The ferritic stainless steel foil may be laminated with a resin film and is useful for producing a battery case.

7 Claims, No Drawings

(56) References Cited

OTHER PUBLICATIONS

Written Opinion (PCT/ISA/237) issued in PCT/JP2016/073931, dated Nov. 22, 2016 with Partial English Translation.
International Search Report (PCT/ISA/210) issued in PCT/JP2016/073931, dated Nov. 22, 2016.
Written Opinion (PCT/ISA/237) issued in PCT/JP2016/073931, dated Nov. 22, 2016.
Yazawa et al., "Ferritic Stainless Steel Sheets with Deep Drawability", JFE Technical Reports, No. 20, Jun. 2008, pp. 72-78.
Extended European Search Report dated Dec. 19, 2018, for corresponding European Application No. 16837114.4.

* cited by examiner

FERRITIC STAINLESS STEEL FOIL

TECHNICAL FIELD

The present invention relates to ferritic stainless steel foil. In particular, it relates to ferritic stainless steel foil provided with good formability regardless of being extremely thin.

BACKGROUND ART

Along with the increasingly smaller size and lighter weight of electronic equipment, electronic equipment has been made more portable and mobile. Smaller size and lighter weight of the lithium ion batteries etc. mounted in many electronic equipment have therefore also been sought. In particular, the smaller size and lighter weight of batteries demanded from smartphones and other electronic equipment demand the cutting edge level of specifications of the times.

At the present time, the battery cases of lithium ion batteries designed for smartphones are being made using cans of thin sheets of aluminum or aluminum foil on which a resin film is laminated. In particular, resin film-laminated aluminum foil is being made much use of for the purpose of improving the capacity density per volume. Recently, thinner sheath materials have been sought for the purpose of further reduction of size and weight. However, with a base material of aluminum foil, if made thinner, pinholes easily form in the process of production and a moisture barrier property cannot be secured. Further, there was the problem that increased thinness causes a drop in the piercing strength and rigidity and makes it impossible to secure strength against shock from the outside or internal expansion of the battery. Therefore, with aluminum foil, a limit has begun to be seen with regard to further reduction of size.

Therefore, attention has been focused on foil comprised of stainless steel due to its higher strength and rigidity compared with aluminum (stainless steel foil). However, stainless steel is higher than aluminum in specific gravity, so for application to battery cases for smaller sized and lighter weight electronic products, extremely thin (for example, 60 µm or less) stainless steel foil is considered required. In particular, to increase the battery capacity, stainless steel foil with a thickness of 60 µm or less while being high in workability, for example, enabling uniform formation even when formed into a rectangular can shape, is being sought.

As extremely thin stainless steel foil, PLT 1 discloses stainless steel foil of a thickness of 25 µm or less. With ultrathin stainless steel foil, voids accompanied with cracking occur from the etched end faces in the rolling direction. PLT 1 discloses an invention limiting the number of 5 µm or more inclusions so as to solve this problem.

Further, as examples of application of stainless steel foil to battery cases, there are PLTs 2 to 4. PLT 2 discloses examples of press-forming thickness 20 to 100 µm stainless steel foil to obtain battery sheaths, PLT 3 thickness 100 µm stainless steel foil, and PLT 4 thickness 40 to 150 µm stainless steel foil.

CITATION LIST

Patent Literature

PLT 1: Japanese Patent Publication No. 2000-273586A
PLT 2: Japanese Patent Publication No. 2004-52100A
PLT 3: Japanese Patent Publication No. 2013-41788A
PLT 4: Japanese Patent Publication No. 2012-92360A
PLT 5: Japanese Patent Publication No. 2007-168184A

Non-Patent Literature

NPLT 1: Yoshihiro Yazawa et al., JFE Technical Reports: 2008, vol. 20, pp. 72 to 78

SUMMARY OF INVENTION

Technical Problem

Normally, ultrathin stainless steel foil, such as when used for springs used for head suspensions for HDDs (hard disk drives), is not annealed after rolling, but is stamped or etched as rolled or after heat treatment such as tension annealing for improving the tensile strength or yield strength. The art of PLT 1 solves the technical problems which occur during such etching.

However, when applying ultrathin stainless steel foil to battery cases, the battery cases are formed by press-forming the ultrathin stainless steel foil. In general, press-forming is classified into deep drawing and stretch-expand forming. Deep drawing, as typified by cylindrical deep drawing, is deformation where tensile deformation occurs in the direction of flow of the material and compression deformation is received in a width direction vertical to the direction of flow. On the other hand, stretch-expand forming is forming giving equi-biaxial tensile deformation in a plane vertical to the thickness direction of the foil (below, "rolling plane"). In the case of a rectangular can shape such as a battery case, the elements of stretch-expand forming become stronger. In particular, the parts of the stainless steel foil forming the corner parts most receive tensile deformation, so if there are many crystal grains oriented in an orientation disadvantageous to deformation present in those parts, even if press-formed, sufficiently deformation is not possible and fracture etc. end up occurring. Therefore, stainless steel foil which is designed to be worked to be stretched in any direction in the rolling plane preferably exhibits a certain extent of good stretch-expand formability in any direction, that is, exhibits good stretch-expand formability with little anisotropy, rather than good stretch-expand formability in a specific orientation.

Based on such a situation, the inventors engaged in in-depth studies and as a result discovered that if applying conventional annealing treatment (for example, bright annealing etc.) to stainless steel foil without any consideration of the treatment conditions, the crystal grains forming the stainless steel foil will increasingly coarsen (grain growth) and the orientations of these crystal grains (crystal orientations) will end up being integrated in a specific orientation. It was believed that if such integration of crystal orientations increases, the anisotropy of deformation with respect to stretch-expand forming will end up becoming greater, uniform forming of the stainless steel foil will become difficult, and the forming depth will become smaller.

PLT 2 describes an example of press-forming thickness 20 to 100 µm stainless steel foil for application to battery cases. However, in PLT 2, there was no awareness of the issue of integration of crystal orientations. For this reason, it is believed that the annealing temperature was high, crystal orientations became increasingly integrated, and the stainless steel foil of PLT 2 had large anisotropy of deformation with respect to stretch-expand forming.

PLT 3 also describes an example of application of thickness 100 µm stainless steel foil to battery cases. However, thickness 100 µm stainless steel foil is relatively thick, so while the workability is high, the effect of increase of the battery capacity due to reduction of the case thickness is small.

PLT 4 describes an example of application of thickness 40 to 150 μm ferritic stainless steel foil to battery sheaths. The art of PLT 4 controls the particle size of the nonmetallic inclusions of the ferritic stainless steel foil and the area ratio at a cross-section. Due to this, it is considered that improvement of the formability by prevention of cracking at the time of press-forming and improvement of the contact of the stainless steel foil and resin at the heat melt bonded parts are achieved. However, the issue of integration of crystal orientations explained above is not recognized.

Note that, in PLT 4, all of the working examples had thicknesses of 100 μm, so the above-mentioned effect of increase of the battery capacity due to the reduction of thickness cannot be expected. Further, there are no working examples of thicknesses less than that. In the art described in PLT 4, it can be said that there was insufficient awareness of the issues involved when making the thickness of stainless steel foil extremely thin and making the forming depth larger.

Further, it is known that, in general, in deep drawing, it is effective to raise the integration at the (111) plane of the stainless steel. For example, in NPLT 1, the chemical composition and manufacturing conditions are studied to raise the integration at the (111) plane and thereby raise the r-value and as a result to improve the deep drawability. However, the problem covered by the present invention in the end relates to shaping of strongly stretching in nature, so this art cannot be applied. Further, NPLT 1 covers material of a thickness of 0.8 mm. Similar findings as well generally relate to thin sheets of thicknesses of 0.2 to 0.3 mm or more.

The present invention was made in consideration of the above situation and has as its object the provision of ferritic stainless steel foil high in stretch-expand formability and further small in anisotropy of deformation with respect to stretch-expand forming even with ultrathin steel foil with a thickness of 60 μm or less.

Note that, the lower limit of thickness of the foil does not have to be especially set, but the realistic limit value of thickness of the foil after rolling is about 5 μm, so the thickness of the ferritic stainless steel foil according to the present invention is made 5 to 60 μm.

Solution to Problem

To solve the above problem, the inventors engaged in intensive studies and obtained the following discoveries.
(A) In ferritic stainless steel, the rolling plane after being rolled is aligned with the (111) plane, so the crystal grains present on the (111) plane or on a plane slightly deviated from the (111) plane are kept from being oriented (integrated) in a specific orientation. That is, in ferritic stainless steel, by reducing the dislocation density while making the crystal grains on the (111) plane etc. randomly oriented, the anisotropy of deformation with respect to stretch-expand forming becomes smaller and the forming depth can be increased.
(B) To reduce the dislocation density while making the crystal grains randomly oriented, it is sufficient to strongly roll reduction at the time of rolling to introduce a large number of dislocations becoming nucleation sites at the time of recrystallization, then annealing to reduce the dislocation density and cause recrystallization while keeping the recrystallized crystal grains in a fine state.
(C) Preferably, the number of crystal grains in the thickness direction is made three or more so as to improve the plastic deformation ability (for example, good stretch-expand formability) and the lower limit of the number of crystal grains in the thickness direction should be determined in accordance with the thickness.
(D) To suppress splitting (cracking) due to surface hardening, it is important to suppress as much as possible the nitriding of the surface layer.
(E) By making the number of crystal grains in the thickness direction three or more and further making the nitrogen concentration of the surface layer 1.0 mass % or less, electrolyte resistance can also be secured. That is, to improve electrolyte resistance, it is important to suppress skin roughness of the stainless steel foil surface at the corner parts after press-forming and to maintain adhesion with the resin film.

The present invention was made based on the above discovery. The aspects of the present invention are as follows:

(1) A ferritic stainless steel foil having a thickness of 5 μm to 60 μm, wherein a recrystallization rate of the stainless steel foil is 90% to 100%, and in an orientation distribution function obtained by analysis of a crystalline texture of the stainless steel foil, when a Euler angle $\phi 2$ is 45°±10°, at the plane expressed by a Euler angle $\Phi$ of 53.4°±10°, the maximum peak strength ratio in the peak strength ratios shown by orientations corresponding to the Euler angle $\phi 1$ is 25 or less, where the Euler angle $\phi 1$ is 0 to 900.

(2) The ferritic stainless steel foil according to (1) wherein the thickness is 5 μm to 40 μm.

(3) The ferritic stainless steel foil according to (1) or (2) wherein three or more crystal grains are contained in the thickness direction.

(4) The ferritic stainless steel foil according to any one of (1) to (3), wherein a surface layer of the ferric stainless steel foil has a nitrogen concentration of 1.0 mass % or less.

(5) The ferritic stainless steel foil according to any one of (1) to (4), wherein a resin film is laminated on at least one surface of the ferritic stainless steel foil has.

Advantageous Effects of Invention

Even with ultrathin stainless steel foil with a thickness of 60 μm or less, it is possible to provide ferritic stainless steel foil with a high stretch-expand formability and further a small anisotropy of deformation with respect to stretch-expand forming. As a result, this is suitable for a battery case etc. of a lithium ion battery etc. designed for smaller size and lighter weight.

DESCRIPTION OF EMBODIMENTS

The present invention will be explained in detail below.
1. Ferritic Stainless Steel Foil
Material of Stainless Steel The ferritic stainless steel foil according to the present invention is not particularly limited so long as comprised of ferritic stainless steel. The ferritic stainless steel preferably has the chemical composition shown below: The chemical composition is, by mass %, C: 0.010% or less, Si: 0.50% or less, Mn: 1.0% or less, P: 0.040% or less, S: 0.030% or less, Cr: 13.0% to 18.0%, Mo: 1.5% or less, N: 0.02% or less, and Sn: 0.15% or less with a balance of Fe and unavoidable impurities.

Thickness of 5 to 60 μm

The ferritic stainless steel foil according to the present invention covers foil of a thickness of 5 to 60 μm. To enhance the effect of increase of the battery capacity when applying this stainless steel foil to a battery case, the thickness is prescribed as being 60 μm or less. The thickness is preferably 50 μm or less, more preferably 40 μm or less, still more preferably 30 μm or less. Further, the lower limit of the thickness is not particularly prescribed, but if considering the limits of manufacturing technology, the thickness of 5 μm may be made the lower limit. Even if the thickness is 5 μm, the effect of the present invention can be enjoyed.

Recrystallization Rate of 90% to 100%

The ferritic stainless steel foil according to the present invention has to have a good stretch-expand formability (plastic deformation ability). Specifically, the structure after rolling is worked and therefore is integrated at the (111) plane, but dislocations and other lattice defects build up. Therefore, even if the crystal grains are fine, the dislocation density is high and the foil hardens. For this reason, it is necessary to suitably control the heat treatment conditions according to the material so as to make the structure recrystallize and obtain a low dislocation density. That is, the recrystallized structure is formed using the dislocation density as a driving force, so it is possible to utilize the reduction of the dislocation density in the recrystallized grains while suppressing coarsening of the recrystallized structure so as to secure good stretch-expand formability (plastic deformation ability).

Note that, as the method for measuring the dislocation density, the etch pit method etc. may be illustrated, but the density is affected by the measurement conditions etc., so quantitative measurement is difficult. It is possible to directly measure the dislocation density by observation by a microscope, but the result depends on the observed field, so the variation is great. Therefore, the inventors discovered that by measuring the recrystallization rate, which is a characteristic value reflecting the dislocation density, it is possible to obtain a grasp of whether suitable heat treatment had been performed.

The recrystallization rate can be calculated by (area of recrystallized crystals)/(observed area). The "area of recrystallized crystals" can be obtained by observing any cross-section of the ferritic stainless steel foil by an optical microscope. Alternatively, it is possible to calculate the half width of the diffraction peak of the (211) plane obtained by X-ray diffraction. If the half width is 0.20 degree or less, the recrystallization rate may be deemed 90% or more, if 0.15 degree or less, the recrystallization rate may be deemed 95% or more, and if 0.10 degree or less, the recrystallization rate may be deemed 100%.

The ferritic stainless steel foil according to the present invention should have a recrystallization rate of 90% or more. If the recrystallization rate is 90% or more, the dislocation density becomes sufficiently low and the formability can be secured. Preferably, the recrystallization rate is 95% or more. If the later explained crystalline texture satisfies the provisions of the present invention, the recrystallization rate may be 100%. That is, the ferritic stainless steel foil according to the present invention as a whole may be recrystallized.

Crystalline Texture

The ferritic stainless steel foil according to the present invention has a distinctive crystalline texture due to making the recrystallization rate within the above range while further controlling the recrystallization process. Specifically, when the Euler angle $\phi 2$ in the orientation distribution function obtained by analysis of the crystalline texture of the stainless steel foil is 45°±10°, the maximum peak strength ratio in the peak strength ratios exhibited by orientations corresponding to the Euler angle $\phi 1$ in the planes expressed by the Euler angle $\Phi$ of 53.4°±10° becomes 25 or less.

While details will be explained later, when the Euler angle $\phi 2$ in the orientation distribution function (ODF) of the crystal grains included in the crystalline texture of the stainless steel foil is 45°, the plane expressed by the Euler angle $\Phi$ of 53.4° corresponds to the (111) plane of the stainless steel foil. Further, when the Euler angle $\phi 2$ is 45° and the Euler angle $\Phi$ is 53.4°, the Euler angle $\phi 1$ corresponds to the orientation on the (111) plane. The orientation on the (111) plane is expressed by the Euler angle $\phi 1$ by a numerical value of 0 to 90°. Note that, in the ferritic stainless steel foil according to the present invention, the (111) plane corresponds to the rolling plane.

Therefore, the definition regarding the crystalline texture using the above ODF relates to the peak strength ratio of the orientation of crystal grains present on the (111) plane and on a plane slightly deviated from the (111) plane. The peak strength ratio shows the degree of integration of crystal grains in a certain orientation. In the present invention, the maximum value of the peak strength ratio is made a specific value or less. In other words, the crystal grains present on the (111) plane and on a plane slightly deviated from the (111) plane are randomly oriented.

In ferritic stainless steel foil after rolling, due to the rolling, the (111) plane tends to be aligned with the rolling plane, but on the (111) plane, the ratio of crystal grains oriented in a specific orientation is small. Therefore, on the (111) plane after rolling, the crystal grains are relatively randomly oriented, but as explained above, the dislocation density is high, so the formability is inferior. Therefore, annealing treatment is used to cause restoration and recrystallization of the structure and lower the dislocation density. At this time, if not controlling the treatment conditions, after recrystallization, the crystal grains will increasingly coarsen (the grains will grow) and crystal grains oriented in an advantageous orientation energy-wise will increase. As a result, the crystal grains will be aligned leaning toward a specific orientation on the (111) plane.

In this case, if stainless steel foil is subjected to stretch-expand forming or other press-forming, while a good formability is exhibited in an orientation advantageous to deformation (orientation where slip easily occurs), the formability sometimes deteriorates in an orientation disadvantageous to deformation (orientation where slip occurs with difficulty). This being so, if, like at the corner parts of a battery case, being subjected to stretch-expand forming so as to be stretched in any direction in the rolling plane, there are orientations exhibiting sufficient elongation (deformation), but fracture etc. sometimes occur starting from orientations disadvantageous to deformation (deterioration of plastic deformation ability) and therefore the desired forming depth cannot be obtained. That is, anisotropy of deformation with respect to stretch-expand forming occurs.

Therefore, in the present invention, to reduce the anisotropy of formability due to the degree of orientation of crystal grains on the (111) plane, the crystal grains are made to be randomly oriented on the (111) plane after annealing treatment and recrystallization. That is, as explained above, in an ODF obtained by analysis of the crystalline texture of the stainless steel foil, if the Euler angle $\phi 2$ is 45°±10°, at a plane expressed by a Euler angle $\Phi$ of 53.4°±10° ((111) plane and plane slightly deviated from (111) plane), the maximum value of the peak strength ratios of the orientations expressed by the Euler angle $\phi 1$ of 0 to 90° is made 25 or less. Due to this, it is possible to eliminate the unevenness of orientations of crystal grains on the (111) plane and a plane slightly deviated from the (111) plane of ferritic stainless steel foil, reduce the anisotropy of formability, and obtain a sufficient forming depth even when subjected to stretch-expand forming such as being stretched in any direction in the rolling plane.

In the present invention, the maximum value of the peak strength ratio is preferably 20 or less, more preferably 15 or less.

The ODF is a function including quantitative information relating to the orientation of directions of the crystal grains and is obtained by 3D analysis by the series expansion method etc. based on a plurality of pole figures including information on orientations of the crystal grains. The pole figures may be obtained using the X-ray pole figure method utilizing X-ray diffraction or may be obtained using the electron back scatter diffraction (EBSD) method. When using the X-ray pole figure method, the measurement region is preferably made a circular region of a diameter of about 10 mm.

In the ODF, the three variables of the Euler angles ($\phi 1$, $\Phi$, and $\phi 2$) are expressed by a 3D orthogonal coordinate system. The point expressed by the coordinates ($\phi 1$, $\Phi$, $\phi 2$) shows one orientation. Therefore, when the peak strength ratio is large at certain coordinates, the ratio of the crystal grains having an orientation corresponding to those coordinates is large, that is, it is shown that the crystal grains are integrated at that orientation. Note that, the Euler angle is prescribed using the definition of Bunge. The peak strength ratio used is the ratio with respect to the peak obtained when measuring randomly oriented α-Fe (powder sample).

In the ODF obtained by analysis of the crystalline texture of ferritic stainless steel foil, when the Euler angle $\phi 2$ is 45° and the Euler angle $\Phi$ is 53.4°, the coordinate group ($\phi 1$, 53.4°, 45°) (where $\phi 1$ is 0 to 90°) shows the orientations on the (111) plane, while, for example, when $\phi 1$ is 0°, it shows the [1 −1 0] orientation.

Therefore, if fixing $\phi 2$ at 45° and $\Phi$ at 53.4° and changing $\phi 1$ from 0 to 90°, when there are many crystal grains integrated at a specific orientation, the peak strength ratio becomes larger, while when the degree of integration is small, the peak strength ratio becomes smaller. From such a change of the peak strength ratio, it is learned at what orientations the crystal grains are integrated (oriented) and at what orientations they are not integrated (are not oriented) on the (111) plane. As explained above, if annealing the structure after rolling, as the structure recrystallizes and the crystal grains grow, the crystal grains on the (111) plane start to be integrated in a preferential orientation. Therefore, depending on the annealing treatment conditions, the peak strength ratio of each orientation in the group of coordinates ($\phi 1$, 53.4°, 45°) (where $\phi 1$ is 0 to 90°) also changes. In this way, in the present invention, the peak strength ratio of the ODF is evaluated so as to evaluate the degree of integration of the orientations of crystal grains at such a specific plane.

At the coordinate group ($\phi 1$, 53.4°, 45°), as explained above, the value of ODF of $\phi 1$ corresponding to the orientation at which the crystal grains are integrated becomes larger, so when making $\phi 1$ change from 0 to 90°, the peak strength ratio shows the local maximum value at $\phi 1$ corresponding to the orientation at which the crystal grains are integrated. The number of points showing the local maximum value (local maximum point) corresponds to the number of orientations at which the crystal grains can easily be integrated. Sometimes there are a plurality of local maximum points. In the present invention, the maximum peak strength ratio in the peak strength ratios of the local maximum points (maximum value of peak strength ratio) is made 25 or less. By setting the upper limit of the peak strength ratio, it is possible to make the crystal grains be randomly oriented on the (111) plane, so it is possible to suppress anisotropy of deformation.

Note that, in a rolled structure, most of the crystal grains are present on the (111) plane, but there is also a relatively large number of crystal grains oriented on a plane slightly deviated from the (111) plane. Therefore, in the present invention, to evaluate the degree of integration of crystal grains oriented on a plane slightly deviated from the (111) plane, the orientations of crystal grains present in the planes of $\phi 2$ of 45°±10° and $\Phi$ of 53.4°±10° are evaluated. That is, tolerance angles are set for $\phi 2$ and $\Phi$.

Further, the smaller the peak strength ratio, the more it is shown that crystal grains of that orientation are not integrated, that is, are random. Therefore, even in a rolled structure before recrystallization, the peak strength ratio sometimes becomes within the above range, but in a rolled structure before recrystallization, the recrystallization rate is low and becomes outside of the scope of the present invention, so this is excluded from the present invention.

Three or More Crystal Grains in Thickness Direction

The ferritic stainless steel foil according to the present invention preferably has three or more crystal grains in the thickness direction. The number of crystal grains in the thickness direction can be found as follows: On any cross-section in the thickness direction, crystal grain sizes are measured based on JIS G 0551 to find the average crystal grain size. The thickness is divided by the average crystal grain size, and the quotient is used as the number of crystal grains in the thickness direction. Note that, when the crystal grains are equi-axed grains, it is also possible to measure the crystal grains in the plane perpendicular to the thickness direction to calculate the average crystal grain size.

Alternatively, any three or more lines are drawn in any cross-section in the thickness direction, the number of crystal grains which these lines cross is counted, and the arithmetic mean of these is taken. At that time, if a crystal grain contacts the surface, it is counted as 0.5 grain. Further, when a line runs along a crystal grain boundary, it is possible to count the plurality of crystals forming the crystal grain boundary. The two end parts in the width direction of the stainless steel foil are easily affected by annealing, so are not suited for measurement of the number of crystal grains. Therefore, it is preferable to draw any line in the thickness direction excluding the two end parts in the width direction of the stainless steel foil and measure the number of crystal grains. For example, it is possible to count the number of crystal grains at three locations of the center of the stainless steel foil in the width direction (position of ½ width from one end) and positions between the two ends and center (two positions of ¼ width and ¾ width from one end) and obtain the arithmetic mean of the same so as to evaluate the number of crystal grains in the thickness direction of the stainless steel foil.

If there are three or more crystal grains found in this way, the plastic deformation ability is improved and the stretch-expand formability becomes excellent, so this is preferable. That is, for the individual crystal grains to plastically deform to any shape, it is necessary that the condition of von Mises be satisfied and a plurality of slip systems cause multi-slip. However, if the number of crystal grains in the thickness direction is small, the probability of crystal grains of orientations not satisfying the von Mises condition for the deformation direction (crystal grains inferior in deformation ability) being aligned in the thickness direction becomes higher. This being so, at the time of press-forming, these crystal grains cannot follow the deformation of the foil as a whole, so end up becoming starting points of fracture. On the other hand, if there are three or more crystal grains in the thickness direction, even if there are crystal grains inferior in deformation ability, the surrounding crystal grains can deform into any shapes and maintain the deformation of the foil as a whole, so as a result, the plastic deformation ability is improved.

Furthermore, if determining the number of crystal grains in the thickness direction in accordance with the thickness, it is possible to better secure the plastic deformation ability, so this is preferable. The greater the thickness, the greater the deformation resistance, so the greater the thickness, the greater the number of crystal grains that should be present. Specifically, if the thickness is 15 µm or more, there are preferably four or more crystal grains in the thickness direction. In particular, when the thickness is 40 µm or more, five or more is more preferable. Due to this, it is possible to further improve the plastic deformation ability. Note that, in the case of ferritic stainless steel foil with a thickness less than 15 µm, the effect of the thickness on the number of crystal grains in the thickness direction is of a negligible extent.

The upper limit of the number of crystal grains is not particularly set. This is because the number of crystal grains in the thickness direction changes depending on the thickness of the ferritic stainless steel foil. If there are three or more crystal grains, the size of the crystal grains (crystal grain size based on JIS G 0051 (below, in this Description, unless otherwise indicated, referred to as "crystal grain size")) is not particularly limited. This is because the above-mentioned multi-slip is determined not by the size of the crystal grains, but by the number of crystal grains in the thickness direction.

Nitrogen Concentration of Surface Layer

As explained above, when nitriding the surface of stainless steel foil, in particular if the thickness becomes smaller, various problems appear due to the hardening of the surface layer resulting from the nitriding. Therefore, the surface layer of stainless steel foil preferably is not nitrided. "The surface layer is not nitrided" means the nitrogen concentration of the surface layer is 1.0 mass % or less. Here, the "surface layer" is made the thickness where the oxygen concentration becomes half of the peak value in measurement by Auger electron spectroscopy and the "nitrogen concentration" is made the average concentration at the surface layer.

Repeating the explanation again, when the surface layer of stainless steel foil is nitrided, at the time of press-forming, the surface layer becomes harder due to the nitriding and thereby it forms starting points of splitting, so the press formability ends up falling. With the stainless steel foil according to the present invention where the thickness is a thin 60 µm or less, the effect of the surface becomes relatively large, so this is a salient issue. By making the nitrogen concentration the above-mentioned range, deformation is possible without the surface layer splitting (cracking), so a good press-formability is obtained. For this reason, the nitrogen concentration of the surface layer is preferably made 1.0 mass % or less as explained above without allowing nitrogen to concentrate at the surface layer of the stainless steel foil. The lower limit of the nitrogen concentration of the surface layer does not have to be particularly set. The lower limit becomes equal to the nitrogen content evaluated for the stainless steel foil as a whole. That is, in the case of the general SUS430 or other type of steel not containing nitrogen, a level of content of nitrogen as an unavoidable impurity is the lower limit.

To make the nitrogen concentration of the surface layer of the stainless steel foil 1 mass % or less, it is possible to control the nitrogen concentration in the annealing atmosphere to 0.1 vol % or less.

Laminated with a Resin Film

The ferritic stainless steel foil according to the present invention, in the same way as usual laminated stainless steel foil, may be laminated with a resin film at its surface to obtain a laminated ferritic stainless steel foil. By laminating the resin film, it is possible to improve the corrosion resistance in the electrolyte and possible to raise the applicability to lithium ion battery and other such battery cases.

The resin film may be laminated on both surfaces of the stainless steel foil or may be laminated on either of the surfaces.

Regarding the peeling strength of the stainless steel foil and the resin, the necessary performance is obtained by providing the surface of the stainless steel foil with a chromate conversion coating layer of a suitable thickness. For example, PLT 5 discloses the art of providing at least one surface of a stainless steel foil with a thickness 2 to 200 nm chromate conversion coating layer and laminating that surface with polyolefin-based resin containing functional groups having polarity.

Further, whitening of the resin after press-forming can be prevented by optimizing the resin design. Specifically, it is sufficient to make the resin after hot lamination amorphous. For that purpose, it is sufficient to increase the cooling rate at the time of hot lamination. For example, the cooling rate in the range of 120° C. to 80° C. is preferably made 20° C./s or more.

2. Method of Production of Ferritic Stainless Steel Foil

Next, the method of production of the ferritic stainless steel foil according to the present invention will be explained.

The process of production of the ferritic stainless steel foil according to the present invention is substantially the same as the process of production of normal stainless steel foil. That is, a stainless steel strip is rolled to a foil, then is washed on its surface and final annealed and, if necessary, is temper rolled (tension leveler) to produce stainless steel foil. Note that, depending on the thickness of the stainless steel strip of the material used for the foil rolling, the foil rolling process may be divided into several stages (multistage rolling) and process annealing may be performed between the foil rolling stages. However, to obtain the ferritic stainless steel foil according to the present invention, as explained before, it is important to control the rolling reduction rate at the final foil rolling and the temperature at the final annealing.

Rolling Reduction Rate

In foil rolling, it is possible to perform the rolling under a strong rolling reduction rate so as to introduce dislocations forming nucleation sites for recrystallization in the stainless steel. The higher the rolling reduction rate, the more the dislocations introduced increase. The dislocation density is controlled together by the rolling reduction rate and the annealing treatment performed after rolling. Therefore, when rolling foil two times or more, the final foil rolling, that is, the foil rolling right before the final annealing is preferably performed under a strong rolling reduction rate.

In the present invention, the rolling reduction rate is preferably made 50% or more. Further, if possible, it is preferably made 60% or more, more preferably 70% or more. Further, the rolling reduction rate in the foil rolling before the final annealing is preferably made 50% or more. From the viewpoint of securing the dislocation density, it is preferably made 60% or more, more preferably 70% or more.

Note that, the rolling reduction rate is defined by the following equation:

Rolling reduction rate=(thickness before rolling−thickness after rolling)/(thickness before rolling).

In rolling foil, the thickness is of course reduced. Introduction of dislocations is also an objective. The upper limit of the rolling reduction rate is not particularly set. However, theoretically, a rolling reduction rate of 100% is impossible, so the realistic upper limit of the rolling reduction rate is 95% or so.

When rolling foil divided over several stages, it is preferable to control the structure of the material in the intermediate foil rolling operations and following process annealing as well. In this case as well, the same procedure as with the final foil rolling is preferably used. That is, the rolling reduction rate in each foil rolling operation is preferably made 50% or more. However, as explained above, foil rolling right before the final annealing is most effective, so the rolling reduction rate of the final foil rolling operation is preferably set higher than the rolling reduction rate of the other foil rolling operations.

Annealing Temperature

The annealing after foil rolling (final annealing) plays the important role of reducing the dislocation density and promoting recrystallization. For the ferritic stainless steel foil according to the present invention, as explained above, the objective is to reduce the dislocation density and promote recrystallization while suppressing grain growth to suppress integration at a specific orientation on the (111) plane etc.

In the case of the ferritic stainless steel foil according to the present invention, the annealing temperature is preferably 850° C. to 950° C. If 850° C. or less, the dislocation density is not reduced, so the recrystallization rate ends up becoming lower. On the other hand, if over 950° C., the crystals become coarser and increasingly are integrated in a specific orientation on the (111) plane etc. so good formability cannot be obtained. The lower limit of the annealing temperature is preferably somewhat higher than 850° C., preferably is 860° C., and more preferably is 870° C.

The upper limit of the annealing temperature also, from the viewpoint of suppressing integration of the crystal orientations, is somewhat lower than 950° C., preferably is 940° C., more preferably is 930° C.

Annealing Holding Time

The time for holding the stainless steel foil at the above-mentioned annealing temperature is preferably 3 seconds to 30 seconds. If less than 3 seconds, the heat treatment becomes insufficient and the recrystallization does not sufficiently proceed so the recrystallization rate prescribed in the present invention cannot be obtained. On the other hand, if over 30 seconds, the recrystallized grains coarsen and increasingly are integrated in a specific orientation on the (111) plane etc. so good formability cannot be obtained.

Annealing Atmosphere

The annealing atmosphere is made hydrogen or argon or other rare gas atmosphere so as to prevent the surface of the stainless steel foil from nitriding. Note that, the annealing atmosphere preferably does not contain any nitrogen at all, but nitrogen unavoidably entering from the atmosphere can be allowed to a certain extent. To make the nitrogen concentration of the surface layer 1.0 mass % or less, the nitrogen concentration in the annealing atmosphere is preferably 0.1 vol % or less.

Process Annealing

When performing the foil rolling step several times, while the process annealing conditions are not particularly set, 850° C. to 950° C. of annealing temperature is preferable. Preferably, the crystal grain boundaries also become nuclei for recrystallization and are introduced in large amounts before foil rolling, so it is preferable to make the temperature the above temperature range to suppress coarsening of the recrystallized grains.

EXAMPLES

As working examples of the ferritic stainless steel foil according to the present invention, stainless steel strip having the chemical composition of SUS430 was rolled under the rolling conditions described in Table 1 by a foil rolling mill to produce ferritic stainless steel foils having the thicknesses described in Table 1.

Here, the "rolling reduction rate" indicates the rolling reduction rate at the cold foil rolling process right before the final annealing, the "finishing annealing temperature" indicates the temperature in the finishing annealing process performed after the end of the rolling process, and the "holding time" indicates the time for holding the stainless steel foil at the final annealing temperature.

The annealing atmosphere was made a mixed gas of 0.1 vol % nitrogen-99.9 vol % hydrogen.

The recrystallization rate was obtained by obtaining a cross-section in the rolling direction for examination, polishing it to a mirror finish, etching it, then examining it to find the area of the crystal grains recrystallized in a range of the total thickness×500 μm width and calculating (area of recrystallized crystals)/(examined area).

The crystalline texture of the stainless steel foil after the finishing annealing was measured by X-ray diffraction and analyzed by an ODF. As the X-ray diffraction apparatus, a RINT2500 made by Rigaku was used. A range of a diameter of 10 mm was measured.

The nitrogen concentration of the surface layer was measured by Auger electron spectroscopy (AES). The concentration down to a depth of 30 nm from the stainless steel foil surface was measured. The average nitrogen concentration down to a depth where the oxygen concentration became a concentration of half of the peak value was made the nitrogen concentration of the surface layer.

The number of crystal grains in the thickness direction was found by cutting out a test piece in the thickness direction, polishing the cross-section, etching it, observing it under a microscope and measuring the crystal grain size based on JIS G 0551 to calculate the average crystal grain size, dividing the thickness by the average crystal grain size, and using the quotient.

Further, using the stainless steel foil after finishing annealing (final annealing), one surface was provided with a 10 nm chromate conversion coating layer then was laminated with a polypropylene film while the other surface was laminated with a polyester film or nylon film to prepare approximately 100 mm square samples. The centers of these samples were press-formed by a size vertical 40 mm×horizontal 30 mm, R1.5 mm punch, R1.5 mm die, and clearance 0.3 mm as conditions to evaluate the maximum depths at which no wrinkling or cracks form. A forming depth of 3.0 mm or more was judged to be good. The results of evaluation are shown in Table 1.

TABLE 1

| Test No. | Foil thickness μm | Rolling reduction rate % | Finishing annealing Temp. ° C. | Finishing annealing Holding time sec | Recrystallization rate % | Max. peak strength ratio $\Phi = 53.4 \pm 10°$ $\phi2 = 45 \pm 10°$ | No. of crystal grains in thickness direction | Surface layer nitrogen concentration mass % | Forming depth mm |
|---|---|---|---|---|---|---|---|---|---|
| Ex. 1 | 25 | 80 | 900 | 5 | 100 | 13.7 | 4.8 | 0.3 | 4.0 |
| Ex. 2 | 25 | 80 | 950 | 5 | 100 | 19.4 | 3.5 | 0.2 | 3.3 |
| Ex. 3 | 25 | 80 | 850 | 5 | 90 | 6.7 | 5.5 | 0.3 | 4.2 |
| Ex. 4 | 25 | 80 | 950 | 10 | 100 | 24.0 | 3.2 | 0.3 | 3.0 |
| Ex. 5 | 5 | 90 | 900 | 10 | 100 | 14.0 | 3.0 | 0.3 | 3.8 |
| Ex. 6 | 10 | 80 | 875 | 5 | 100 | 18.5 | 3.2 | 0.4 | 3.6 |
| Ex. 7 | 15 | 60 | 850 | 3 | 90 | 5.0 | 3.5 | 0.2 | 4.2 |
| Ex. 8 | 20 | 80 | 900 | 3 | 100 | 16.5 | 4.1 | 0.3 | 3.7 |
| Ex. 9 | 40 | 90 | 925 | 10 | 100 | 19.6 | 5.0 | 0.3 | 3.5 |
| Ex. 10 | 60 | 60 | 900 | 3 | 100 | 15.0 | 10.0 | 0.5 | 4.3 |
| Comp. Ex. 1 | 25 | 80 | 1000 | 5 | 100 | 26.8 | 2.5 | 0.3 | 2.5 |
| Comp. Ex. 2 | 25 | 80 | 800 | 5 | 80 | 4.7 | 8.3 | 0.2 | 2.6 |
| Comp. Ex. 3 | 20 | 50 | 600 | 5 | 0 | 3.0 | 7.5 | 0.2 | 2.1 |

As shown in Table 1, in the working examples of the ferritic stainless steel foil according to the present invention, the peak strengths prescribed in the present invention were low and as a result the forming depth was 3.0 mm or more.

Comparative Example 1 had a high finishing annealing temperature, so recrystallization sufficiently proceeded. Furthermore, while the grains grew, the recrystallized crystal grains were integrated at a specific orientation and the peak strength became large. As a result, anisotropy occurred with respect to the stretch-expand forming and the forming depth became small.

Comparative Example 2 had a low finishing annealing temperature, so the recrystallization did not sufficiently proceed and the recrystallization rate became low. As a result, the forming depth became small. Note that, since the finishing annealing temperature was low, the state became one close to the structure after rolling and the crystal grains became randomly oriented.

From the above results, it was confirmed that in the working examples and comparative examples, there is a 0.7 mm or more difference in the forming depth. This difference is an extremely significant difference as shown below. That is, when stainless steel foil is, for example, applied to a battery case mounted in a smartphone or other small sized and light weight electronic product, a battery case of a thickness of about several mm is demanded. In view of such a situation, if the forming depth becomes 0.7 mm or more larger, this corresponds to 20% or more of the thickness of the battery case and contributes greatly to increase of the battery capacity. Therefore, the effect of the present invention is extremely large.

INDUSTRIAL APPLICABILITY

The ferritic stainless steel foil according to the present invention can be applied to a battery case etc. of a lithium ion battery etc. for a small sized electronic product.

The invention claimed is:

1. A ferritic stainless steel foil having a thickness of 5 μm to 40 μm, wherein a recrystallization rate of said stainless steel foil is 90% to 100%, and in an orientation distribution function obtained by analysis of a crystalline texture of said stainless steel foil, when a Euler angle $\phi2$ is 45°±10°, at a plane expressed by a Euler angle $\Phi$ of 53.4°±10°, a maximum peak strength ratio in peak strength ratios shown by orientations corresponding to a Euler angle $\phi1$ is 25 or less, where the Euler angle $\phi1$ is 0 to 90°.

2. The ferritic stainless steel foil according to claim 1 wherein a number of crystal grains in the thickness direction is three or more, wherein the number of crystal grains is obtained by dividing the thickness by average crystal grain size based on JIS G 0551.

3. The ferritic stainless steel foil according to claim 1, wherein a surface layer of the ferric stainless steel foil has a nitrogen concentration of 1.0 mass % or less.

4. The ferritic stainless steel foil according to claim 1, wherein a resin film is laminated on at least one surface of said ferritic stainless steel foil.

5. The ferritic stainless steel foil according to claim 2, wherein a surface layer of the ferric stainless steel foil has a nitrogen concentration of 1.0 mass % or less.

6. The ferritic stainless steel foil according to claim 2, wherein a resin film is laminated on at least one surface of said ferritic stainless steel foil.

7. The ferritic stainless steel foil according to claim 3, wherein a resin film is laminated on at least one surface of said ferritic stainless steel foil.

* * * * *